US008213923B1

(12) United States Patent
Lu et al.

(10) Patent No.: US 8,213,923 B1
(45) Date of Patent: Jul. 3, 2012

(54) PRODUCT UPDATE VIA VOICE CALL IN MOBILE SECURITY

(75) Inventors: Kun Lu, Nanjing (CN); Shiyu Xie, Nanjing (CN); Liulin Yang, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 1068 days.

(21) Appl. No.: 11/934,255

(22) Filed: Nov. 2, 2007

(51) Int. Cl.
*H04M 3/00* (2006.01)

(52) U.S. Cl. ......... 455/419; 455/418; 455/420; 455/410

(58) Field of Classification Search .................. 455/419, 455/420, 418, 410
See application file for complete search history.

(56) References Cited

U.S. PATENT DOCUMENTS

| 6,760,908 | B2 * | 7/2004 | Ren ............................. 717/173 |
| 7,904,608 | B2 * | 3/2011 | Price ............................ 710/11 |
| 2003/0074581 | A1 * | 4/2003 | Hursey et al. ................. 713/201 |
| 2004/0117623 | A1 * | 6/2004 | Kalogridis et al. ........... 713/165 |
| 2005/0097179 | A1 * | 5/2005 | Orme ........................... 709/207 |
| 2007/0117593 | A1 * | 5/2007 | Izdepski ....................... 455/565 |
| 2008/0240675 | A1 * | 10/2008 | Berger et al. .................. 386/66 |
| 2010/0077360 | A1 * | 3/2010 | Nason et al. .................. 715/856 |
| 2010/0122324 | A1 * | 5/2010 | Welingkar et al. ................ 726/5 |

OTHER PUBLICATIONS

U.S. Appl. No. 11/369,704, filed Mar. 7, 2006.
U.S. Appl. No. 11/362,678, filed Feb. 27, 2006.
U.S. Appl. No. 10/863,885, filed Jun. 8, 2004.

* cited by examiner

*Primary Examiner* — Barry Taylor
(74) *Attorney, Agent, or Firm* — Beyer Law Group LLP (57) ABSTRACT

Methods and apparatus for updating security software products on mobile telephones are described. When an update is available for a security software product installed on a mobile telephone, a server encodes and optionally compresses the update data from binary format into audio format. The server establishes a voice connection with the mobile telephone. The update data in audio format is transmitted to the mobile telephone via the voice connection. Upon receiving the complete update data in audio format, the mobile telephone decodes and optionally decompresses the update data from audio format back into binary format. The security software product installed on the mobile telephone is updated using the update data in binary format.

21 Claims, 7 Drawing Sheets

PRODUCT UPDATE VIA VOICE CALL IN MOBILE SECURITY

BACKGROUND OF THE INVENTION

The present invention generally relates to updating anti-malware products for mobile telephones. More specifically, the present invention relates to transmitting anti-malware product updates to mobile telephones via voice telephone calls.

Malicious software, or malware, such as viruses, spyware, adware, worms, etc., is software designed to infiltrate and/or damage computer systems without their owners' consent. Malware attacks computer systems both large and small, such as workstations, personal computers (PCs), personal digital assistants (PDAs), smart mobile telephones (smartphones), etc. and often causes great damages. Needless to say, it is very important to protect all types of computer systems against various forms of malware.

Many software applications have been developed to protect computer systems against various types of malware. Regardless of the types of computer systems such software applications protect, one common feature among anti-malware applications is that the software needs to be updated from time to time. For example, as new types of malware appear, the anti-malware applications need to be updated with new malware patterns, i.e., information about the new malware, in order for the anti-malware to be able to detect and combat the new malware. Similarly, as new versions of the anti-malware applications become available, the older versions of the anti-malware applications need to be updated in order to incorporate new features and/or functionalities. Often, the anti-malware developers transmit product updates to their customers whenever necessary to update their software.

There are different ways to transmit anti-malware product updates to the customers. For example, with computer systems connected to the Internet, the product updates may be transmitted via the Internet. With other types of systems, such as mobile telephones, product updating via the Internet may not be the best solution, because many mobile telephones are not often connected to the Internet. In fact, some mobile telephones, especially mobile telephones located in certain regions, may rarely be connected to the Internet. Other times, connecting to the Internet from mobile telephones may be very expensive. As a result, mobile telephone customers may not be able to receive product updates for their anti-malware quickly via the Internet.

With mobile telephones, anti-malware product updating may be done in several alternative ways, but each has some shortcomings. For example, a mobile telephone customer may download product updates manually via the Internet. In this case, if the customer does not connect to the Internet and check for product updates frequently enough, there may be a long delay before he or she receives the most recent updates. Then, the anti-malware on the customer's mobile telephone may not be up-to-date and critical updates may not be applied in time to deter new types of malware.

Alternatively, the mobile telephone customer may receive product updates from other mobile telephones via Bluetooth® connections. In this case, there is a limitation in transmission distance, which is inherent in Bluetooth® technologies. Or, the mobile telephone customer may receive product updates via multimedia messaging service (MMS). In this case, there is a limitation in the size of the data being transmitted, as many telecommunications companies providing MMS limit the transmission sizes. The mobile telephone customer may receive product updates via peer-to-peer transfer. In this case, the customer still needs to connect to the Internet first, which may be inconvenient and/or expensive.

Accordingly, what are needed are systems and methods to improve the process of updating anti-malware for mobile telephones.

SUMMARY OF THE INVENTION

Broadly speaking, the present invention generally relates to systems, methods, and computer program products for updating anti-malware, i.e., security software, products for mobile telephones via voice telephone calls.

According to various specific embodiments of the invention, methods and apparatus are provided in which security product updates are transmitted from a server to a mobile telephone via voice calls in a distributed mobile telephone network having at least one server and at least one mobile telephone.

When security product updates become available, the server encodes and optionally compresses the security product updates into audio format. The server contacts the mobile telephone by initiating a voice call to the mobile telephone. The mobile telephone, upon receiving the voice call signal from the server, responds appropriately, and an audio connection is established between the server and the mobile telephone. Thereafter, the server transmits the security product updates in audio format to the mobile telephone via the audio connection.

After the mobile telephone receives the complete security product updates in audio format, it decodes the product updates into binary format. The security product installed on the mobile telephone is then updated using the product updates in binary format.

In addition, during the transmission of the security product updates, if the mobile telephone receives another standard telephone call from a third party, the product updating process may be temporarily suspended. The server records the current status of the transmission, and the audio connection between the server and the mobile telephone is then severed so that the mobile telephone may answer the telephone call from the third party. After the telephone call with the third party is completely, the audio connection between the server and the mobile telephone is reestablished, and the transmission of the security product updates resumes.

Because voice calls are the most common and easiest method to communicate with mobile telephones, by transmitting security product updates to the mobile telephones via voice connections, the present invention ensures that the mobile telephones receive the product updates automatically and as soon as they become available. The mobile telephones are not required to be connected to the Internet. There is no limitation on the size of the data that may be transmitted. And the owners of the mobile telephones need not check for product updates manually and/or periodically.

These and other features, aspects, and advantages of the invention will be described in more detail below in the detailed description and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. In addition, while the invention will be described in conjunction with the particular embodiments, it will be understood that it is not intended to limit the invention to the described embodiments. To the contrary, it is intended to cover alternatives, modifications, and equivalents as may be included within the spirit and scope of the invention as defined by the appended claims.

Almost all types of software products require periodical updating, such as when new features and/or functionalities become available. This is especially true for security software products or anti-malware products, since new viruses and other types of malware appear from time to time. In order to catch, deter, and eradicate all known malware, the anti-malware products need to be updated quickly with the most current information about how to combat the new malware whenever it appears. Thus, with anti-malware products or security software products, product updates need to be transmitted to the customers as soon as possible after they become available.

Often, for security software products installed on computer systems connected to the Internet, product updates may be transmitted to the systems via the Internet. On the other hand, for security software products installed on mobile telephones, transmitting product updates to the mobile telephones via the Internet may not be the best solution, because not all mobile telephones are frequently connected to the Internet. In fact, mobile telephones located in certain regions may be rarely connected to the Internet, and for other mobile telephones, connecting to the Internet may be inconvenient and expensive. As a result, security software products installed on the mobile telephones may not be able to receive the most current product updates soon enough to deter new types of malware.

The most standard way of communicating with mobile telephones is via voice connections, such as standard telephone calls. With standard telephone calls, audio data is transmitted to and from the mobile telephones by radio waves. The inventors of the present invention have realized that product updates for security software installed on the mobile telephones may be encoded in audio format and transmitted to the mobile telephones via standard voice connections using an inventive technique. Once the mobile telephones receive the product updates in audio format, they may then decode the product updates back to binary format and update the security software products accordingly.

Figure 1:
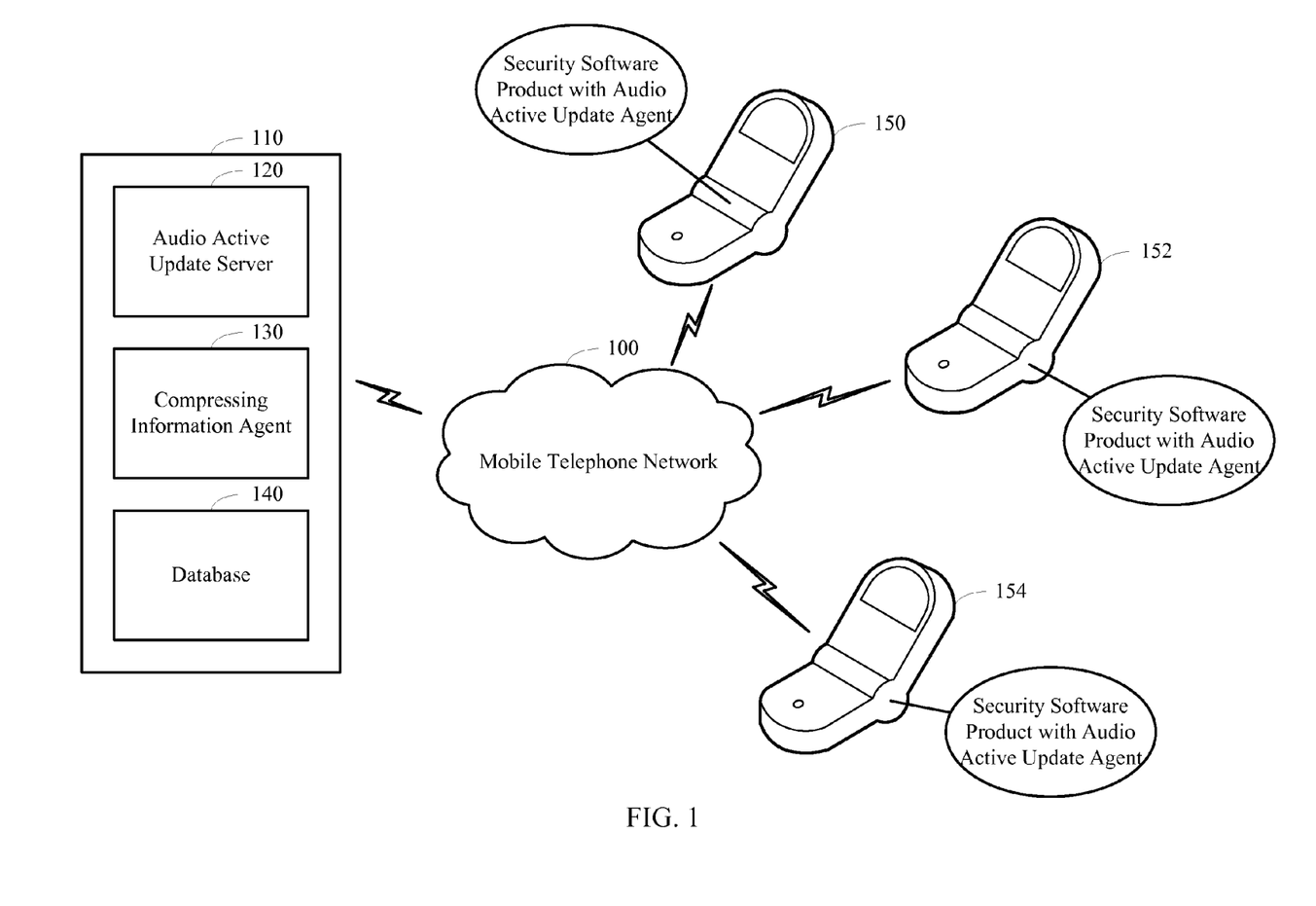
FIG. 1 illustrates an example of a distributed mobile telephone network having a server and several mobile telephones.

FIG. 1 illustrates an example of a distributed mobile telephone network having a server and several mobile telephones, in which product updates for security software installed on mobile telephones may be transmitted to the mobile telephones via standard voice connections. To simplify the discussion, FIG. 1 only shows one server 110 and three mobile telephones 150, 152, 154 included in the mobile telephone network 100, although the same concept applies for mobile telephone networks having any number of servers and mobile telephones. Server 110 may be various types of computers, such as workstations, main frame computers, a group of inter-connected computers, servers, etc. For instance, Dell™ PowerEdge™ 2950 or HP™ ProLiant™ DL380G5 may be suitable candidates for server 110.

On the server 110 side, there may be various components, each featuring different functionalities. For example, there may be an audio active update server 120 that is responsible for establishing voice connections with the mobile telephones 150, 152, 154 and transmitting security software product updates to the mobile telephones 150, 152, 154 via the voice connections when they become available.

There may be a compressing information agent 130 that is responsible for encoding the product updates into audio format and optionally compresses the encoded product updates before the active update server 120 transmits them to the mobile telephones.

Audio active update server 120 and compressing information agent 130 may be software modules implemented using computer languages such as C, C++, Java™, etc.

There may be a database 140 for storing the product updates both in its original binary format and in audio format once they are encoded by the compressing information agent 130. In addition, information associated with the mobile telephones 150, 152, 154, such as telephone numbers, security software products installed, product components version information, customer registration information, user purchase history, product entitlement information, etc. may be stored in the same database 140 or another database (not shown) communicatively connected to the audio active update server 120. The audio active update server 120 may use such information associated with the mobile telephones 150 to establish voice connections with the mobile telephones 150, 152, 154 and transmit the correct product updates to the mobile telephones 150, 152, 154.

On the client side, i.e., the mobile telephone side, each mobile telephone 150, 152, 154 has one or more security software products installed thereon. The mobile telephones 150, 152, 154 may be various types of telephones, such as cellular telephones, smartphones, PDAs, etc. that allow a user to communicate by voices connections. Examples of mobile telephones include Nokia's Nseries devices, Apple's iPhone™, Palm's Treo™ devices, etc. The security software product(s), such as Trend Micro™ Mobile Security, are responsible for detecting, deterring, and eradicating malware, such as viruses, worms, adware, or spyware, from causing damages to the mobile telephones 150, 152, 154; that is, protecting the mobile telephones 150, 152, 154 from malware instructions and/or attacks.

Similarly, there may be various components included in the security software product(s) installed on the mobile telephones 150, 152, 154, each of which featuring different functionalities. For example, there may be one component responsible for scanning and detecting viruses and another component responsible for filtering incoming data. Additional components may be responsible for blocking un-welcoming phone calls, etc.

There may be an audio active update agent responsible for receiving product updates in audio format transmitted over the voice connections from the server 110 and decoding the product updates in audio format back to binary format so that the security software product(s) installed on the mobile telephones 150 may be updated therewith. Again, the audio active update agent may be a software module implemented using computer languages such as C, C++, Java™, etc.

Finally, the server 110 and the mobile telephones 150, 152, 154 communicate with each other via the mobile telephone network 100, such as GSM, PCS, NMT, TACS/ETACS, or JTACS systems.

The components shown in FIG. 1 for the server 110 and the mobile telephones 150, 152, 154 are only one example of the system. In alternative embodiments, both the server 110 and the mobile telephones 150, 152, 154 may have different components, i.e., different number of components, components with different names and functionalities, etc. For example, the server 110 may have one component responsible for both encoding the product updates and transmitting the encoded product updates to the mobile telephones. Or the database may be an independent unit separate from the server 110 and yet communicatively connected with the server 110.

Regardless of the actual architectures employed for the server 110 and the mobile telephones 150, at a minimum, the server 110 needs to support the functionalities of encoding security software product updates into audio format, establishing voice connections with the mobile telephones, and transmitting the encoded product updates to the mobile telephones via the voice connections. And each mobile telephone 150 needs to support the functionalities of receiving the encoded product updates in audio format from the server 110 via the voice connection, decoding the product updates back into binary format, and updating the security product(s) installed thereon using the decoded product updates.

Figure 2:
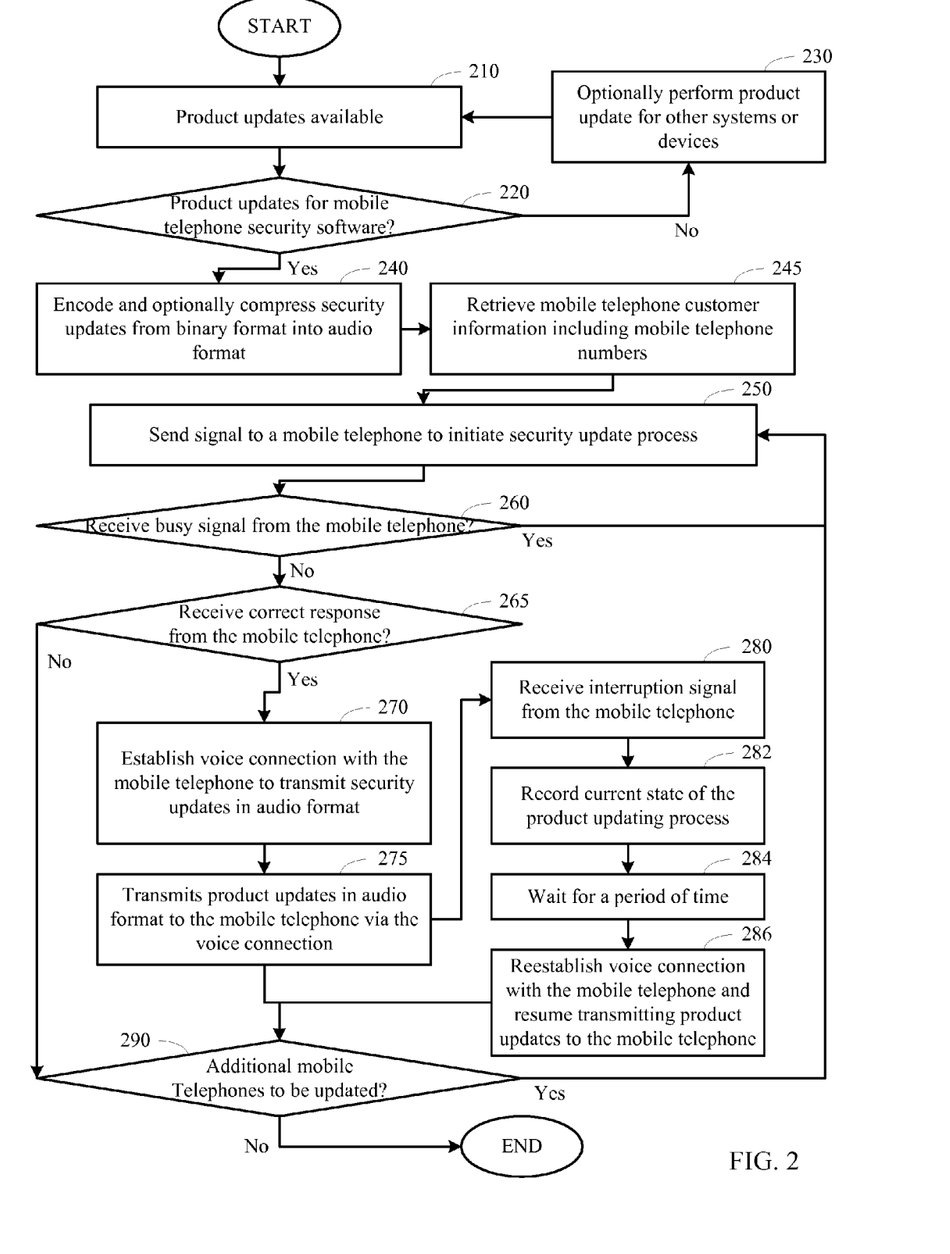
FIG. 2 illustrates a method of updating security products for mobile telephones from a server's perspective.
Figure 3:
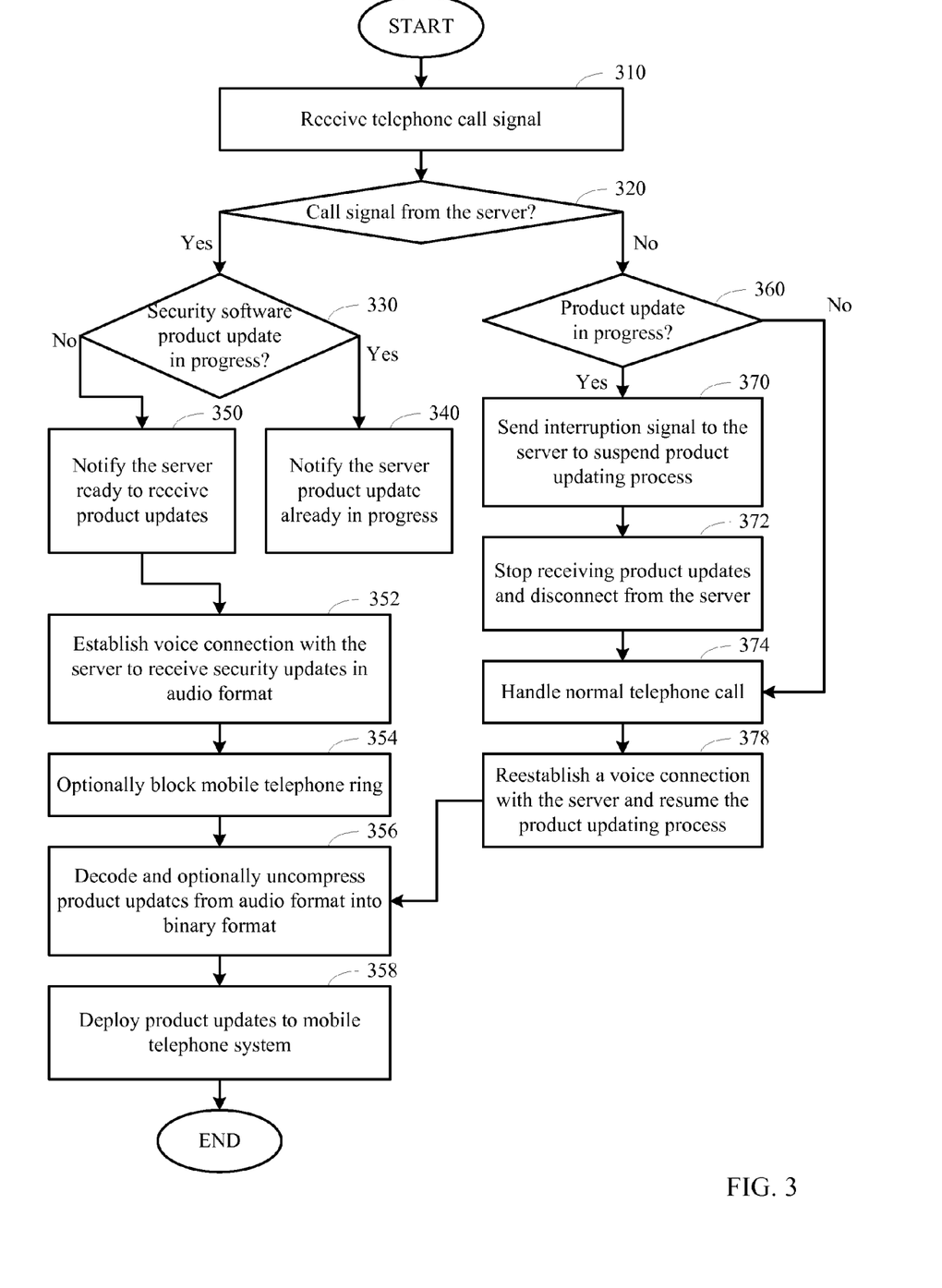
FIG. 3 illustrates a method of updating security products for mobile telephones from a mobile telephone's perspective.

To further describe the product update process, FIG. 2 illustrates a method of updating security products for mobile telephones from a server's perspective, and FIG. 3 illustrates a method of updating security products for mobile telephones from a mobile telephone's perspective. FIGS. 2 and 3 are discussed together in order to present a complete picture of the process.

When new product updates, e.g., new version of the product or information on new types of malware, become available (FIG. 2, step 210), the server determines whether the product updates are for mobile telephone security software (FIG. 2, step 220). A new update may be a computer file, such as virus patterns, executable file, library file, etc. In one or more embodiments, the server may handle product updating of security software designed for different types of systems, such as computers, PDAs, or mobile telephones. Thus, if the product updates are for security software installed on systems other than mobile telephones, then the server may proceed with product updating for these other systems or devices according to the specific characteristics, designs, and/or architectures of the security software being updated (FIG. 2, step 230), e.g., updating security software products via the Internet.

On the other hand, if the product updates are for security software installed on mobile telephones, then the server encodes the product updates from binary format into audio format (FIG. 2, step 240) so that the updates may be transmitted to the mobile telephones via standard voice connections. There are different ways to encode the binary product update data into audio format. In a simple example, since all binary data may be represented with two values, e.g., "0" and "1", two distinct audio tones may be used to encode the two binary values, with one audio tone representing the value "0" and the other audio tone representing the value "1". Then, a series of these two (2) particular audio tones may be used to transmit a series of binary data, one tone for each digit. Other encoding protocols and/or algorithms may also be used.

In addition, preferably, although optionally, the server compresses the product update data during the encoding process in order to decrease the size of the data for transmission (FIG. 2, step 240). Again, there are different ways to compress data. An existing compression algorithm may be used or a new compression algorithm may be designed and implemented. In another simple example, the binary product update data may first be compressed into hexadecimal format, with one (1) hexadecimal digit representing four (4) binary digits. Then the hexadecimal data may be encoded using sixteen (16) distinct audio tones, with one audio tone representing each possible hexadecimal value, i.e. "0" to "9" and "A" to "F". A series of these sixteen (16) audio tones may be used to transmit a series of hexadecimal data. In comparison to transmitting uncompressed binary data described above, only one-fourth (¼) of the number of audio tones need to be transmitted.

There are many audio compression/decompression algorithms in existence. Some of these algorithms are lossless (e.g., Monkey's Audio, FLAC, and Shorten) and others are lossy (e.g., Vorbis and MP3). Regardless of which compression algorithm is used, a lossless compression algorithm is preferred so that no product update data is lost during the compression/decompression process. Furthermore, the encoded product update data may be stored in a location accessible by the server, such as in a database or in a file, so that the server may transmit the encoded data to the mobile telephones in the future. The encoded audio data may be stored using various audio formats, such as WAV, AIFF, AU, FLAC, etc.

In one or more embodiments, the binary file format is unique and specifically designed for Trend Micro™ products. It includes encrypted data information, digital signature, and Trend Micro™ product license. Audio data will be encoded into binary format and decoded by specific algorithms, such as Digital Audio Compression (AC-3). To achieve efficiency, the audio data is stored in private format.

In addition, the server may retrieve information relating to the mobile telephones and their customers (FIG. 2, step 245). This information may be stored in a database or one or more files accessible by the server. The information may include the telephone numbers for the mobile telephones, the security software product(s) installed on the mobile telephones, version number for the security software product, the date of the last update, the customers' registration information, etc. Such information helps the server determine which mobile telephones have security software installed thereon that needs to be updated and how to establish voice connections with these mobile telephones. For example, if there are multiple mobile telephone security software products available, and the product updates are for one particular security software product, the information may help the server determine which mobile telephones have that particular security software product installed thereon, and then the server only needs to contact those mobile telephones. Similarly, the information may help the server determine which customers are entitled to receive product updates, e.g., have paid for the right of receiving product updates, so that the server only contacts the mobiles telephones belonging to those customers.

Note that steps 240 and 245 may be performed in any order or simultaneously, since they are not dependent upon each other in any way.

Once the server has a list of mobile telephones whose security software products need to be updated, the server sends a signal to each of the mobile telephones to establish a voice connection for transmitting the product updates (FIG. 2, step 250). The server may connect to the mobile telephones one at a time. Alternatively, the server may connect to multiple mobile telephones simultaneously. The initial signal sent to each mobile telephone simulates a telephone call signal. Techniques for dialing a telephone number are known in the art.

When a mobile telephone receives the telephone call signal from the server, the mobile telephone may or may not be available. For example, if the mobile telephone is in use or is turned off, then no connection can be established at the moment. In this case, a busy signal may be sent back to the server, indicating that the mobile telephone is currently unavailable.

Upon receiving a busy signal from the mobile telephone (FIG. 2, step 260), the sever waits for some time before contacting the mobile telephone again. For example, the unavailable mobile telephone may be moved to the end of the list, and in the mean time, the server contacts other mobile telephones still on the list to update their security software products first.

On the other hand, if the mobile telephone receives a telephone call signal while it is available (FIG. 3, step 310), e.g., the telephone is on standby, the mobile telephone determines if the telephone call signal is from the server (FIG. 3, step 320). Once the Audio Active Update Agent (AAUA) recognizes that the incoming call is from the server, it will disable the ringing capability of the mobile telephone. At this point, there are two possibilities.

In a first scenario, if the telephone call signal is from the server, then the mobile telephone determines if a software product update is already in progress (FIG. 3, step 330), because it may be possible that the server has sent a duplicate call signal by mistake. If a product update is currently in progress, then the mobile telephone may send a response to the server, notifying the server that a product updating process is already in progress so that the server does not attempt to transmit the product updates again (FIG. 3, step 340). On the other hand, if no product updating process is currently in progress and the mobile telephone is ready to receive product updates, the mobile telephone sends a different response to the server, notifying the server that it is ready to receive product updates (FIG. 3, step 350). The original response produced by the mobile phone is also in binary format. After the binary response is encoded into audio format, the audio response is sent to server.

On the server side, when the server receives the response from the mobile telephone, it determines whether the response indicates that the mobile telephone is ready to receive product updates (FIG. 2, step 265). If the response indicates that the mobile telephone is not ready for any reason, e.g., the response indicates that a product update is already in progress with this mobile telephone, then the server moves to the next mobile telephone on the list (FIG. 2, step 290).

On the other hand, if the response indicates that the mobile telephone is ready to receive product updates, a voice connection is established between the server and the mobile telephone (FIG. 2, step 270; FIG. 3, step 352). The mobile telephone's ringing function is optionally blocked so that its owner is not disturbed during the product updating process (FIG. 3, step 354). Blocking the telephone's ringing function is provided by the mobile telephone platform operation system in terms of specific Software Development Kit (SDK) Application Programming Interface (API).

Thereafter, the server transmits the product update data encoded in audio format over the voice connection to the mobile telephone (FIG. 2, step 275). The mobile telephone may record the audio product updates so that they may be decoded once the transmission is completed. For example, the audio data may be recorded into an audio file and temporarily saved on the mobile telephone. According to various embodiments, after the initial hand-shaking process, the server starts to transfer audio data just like a normal telephone call. At the same time, a built-in recorder in Audio Active Update Agent saves the audio data into a temporary file for decoding later.

If there is no interruption during the transmission of the product updates, then once all the data have been transmitted, the mobile telephone decodes and optionally un-compresses the product update data from audio format back into binary format (FIG. 3, step 356). This is essentially the reverse of the encoding process performed on the server side (FIG. 2, step 240). The audio data is decoded into binary data and may be temporarily stored in a file on the telephone. The security software product installed on the mobile telephone is updated using the decoded product update data as the normal updating process (FIG. 3, step 358).

The server, upon complete and successful transmission of the product updates to the mobile telephone, removes the mobile telephone from the list, so that the server does not attempt to transmit updates to the same mobile telephone multiple times.

In a second scenario (referring to FIG. 3, step 320), if the telephone call signal is not from the server, i.e., from a third-party caller, then the mobile telephone determines whether a software product update is currently in progress (FIG. 3, step 360). For example, a call from the server may be distinguished with a special and unique ringing signal or unique telephone number, which is different from the call signals or numbers from other telephones. If no product update is currently in progress, then the mobile telephone handles the telephone call from the third-party caller normally (FIG. 3, step 374), i.e., ringing to inform its owner that there is an incoming telephone call and enabling the owner answer it.

If a product update is currently in progress, i.e., an interruption occurs during the transmission of the product updates from the server to the mobile telephone, then the mobile telephone has a few options in handling such situation. In one example, the mobile telephone may ignore the telephone call from the third-party caller and continue with the product update. Although this allows the product updating process to complete as quickly as possible, it may not be the most user-friendly option. For example, the telephone call from the third-party may be important to the telephone's owner, in which case missing the call may cause the owner problems.

Alternatively, the product update may be temporarily suspended to enable the telephone's owner to answer the call from the third-party. In this case, the mobile telephone first sends an interruption signal to the server to notify the server that the product update needs to be suspended (FIG. 3, step 370). Again, the interruption signal may be a unique signal. Then, the mobile telephone stops receiving the product updates and severs the voice connection with the server (FIG. 3, step 372). The mobile telephone handles the telephone call from the third-party caller normally (FIG. 3, step 374), i.e., ringing to inform its owner that there is an incoming telephone call and enabling the owner answer it.

On the server side, when the server receives the interruption signal from the mobile telephone while in the middle of transmitting product updates to the mobile telephone (FIG. 2, step 280), the server records the current state of the product updating process (FIG. 2, step 282). For example, the server may note how much product update data has already been transmitted, and which mobile telephone the interruption signal has come from. The sever waits for some time before contacting the mobile telephone again to complete the product update (FIG. 2, step 284). Again, for example, this particular mobile telephone may be moved to the end of the list, and in the mean time, the server may contact other mobile telephones still on the list to update their security software products first. The server may adjust the waiting time as necessary.

Some time later, when the telephone call with the third-part has been completed, the server reestablishes a voice connection with the mobile telephone and resumes transmission of the product updates to the mobile telephone over the voice connection (FIG. 2, step 286; FIG. 3, step 378). The server may go through the same steps as before to reestablish a voice connection with the mobile telephone, e.g., starting by sending a telephone call signal to the mobile telephone and so on (referring to FIG. 2, steps 250, 260, 265, 270, and 275). Once a new voice connection is established between the server and the mobile telephone, the server may resume the transmission of the product updates in audio format from where it was interrupted, since the server has previously recorded at what point during the transmission the interruption has occurred (referring to FIG. 2, step 282).

It is possible that multiple interruptions may occur during a product updating process. In this case, each time there is an interruption, the transmission of the product updates may be temporarily suspended, until the interruption has been handled. Then, a new voice connection may be reestablished between the server and the mobile telephone to resume the product updating process.

Again, once the mobile telephone has received all the product update data, it may decode and uncompress the audio data back into binary format (FIG. 3, step 356) and the security product installed on the mobile telephone may be updated with the product update data (FIG. 3, step 356). The server, upon complete and successful transmission of the product updates to the mobile telephone, removes the mobile telephone from the list.

The same product updating process may be repeated for each of the mobile telephones whose security product needs to be updated, until all mobile telephones have been updated (FIG. 2, step 290).

Because product updates are transmitted from the server to each of the mobile telephones over voice connections, it is important that the server is able to encode the binary update data into audio format, and each of the mobile telephones is able to decode the received audio update data back into binary format.

Figure 4:
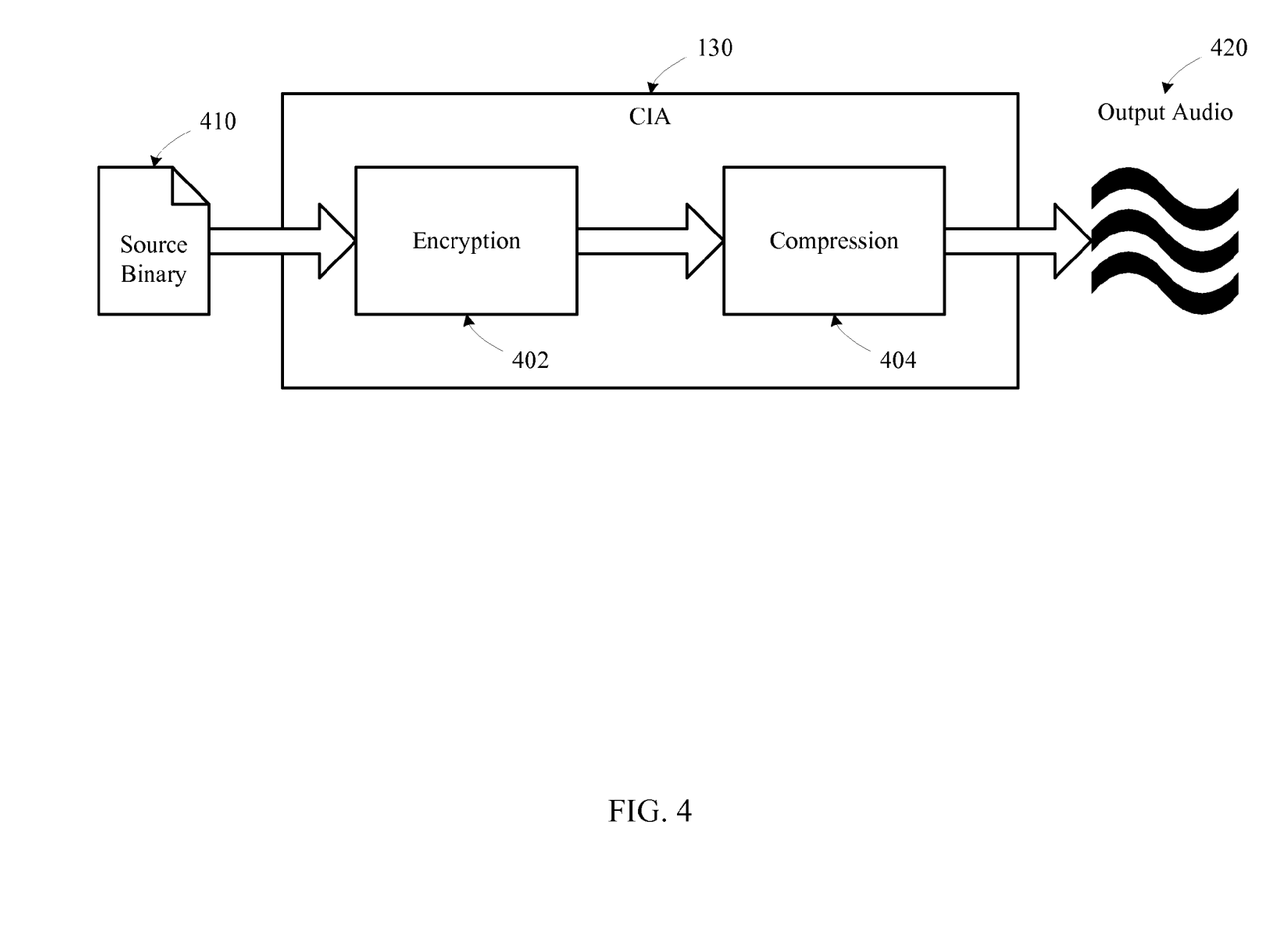
FIG. 4 illustrates an encoding process on a server.

As described above in FIG. 1, on the server side, the encoding of the binary product update data may be handled by the Compressing Information Agent (CIA), which, in this particular embodiment, is a software component running on the server. FIG. 4 illustrates an encoding process by the Compressing Information Agent on a server. Essentially, the Compressing Information Agent 130 takes the product update data in binary format 410 as input and outputs the product update data in audio format 420.

When binary product update data 410, e.g., new virus patterns or new versions of the security software, becomes available, it may be stored in a file or a database. Regardless of where the binary data 410 is stored, the binary data 410 may be sent to the Compressing Information Agent 130 for encoding. The Compressing Information Agent 130 encrypts 402 the binary data into audio format based on a particular encryption protocol or algorithm and compresses 404 the data based on a particular compression algorithm. The encryption 402 and the compression 404 of the binary update data 410 may be done in two separate steps as shown in FIG. 4 or combined in a single step. And if they are done in two separate steps, the order may vary, i.e., depending on the actual implementation, either encryption 402 or compression 404 may be done first, followed by the other. The encrypted and compressed data is outputted in audio format 420.

Figure 5:
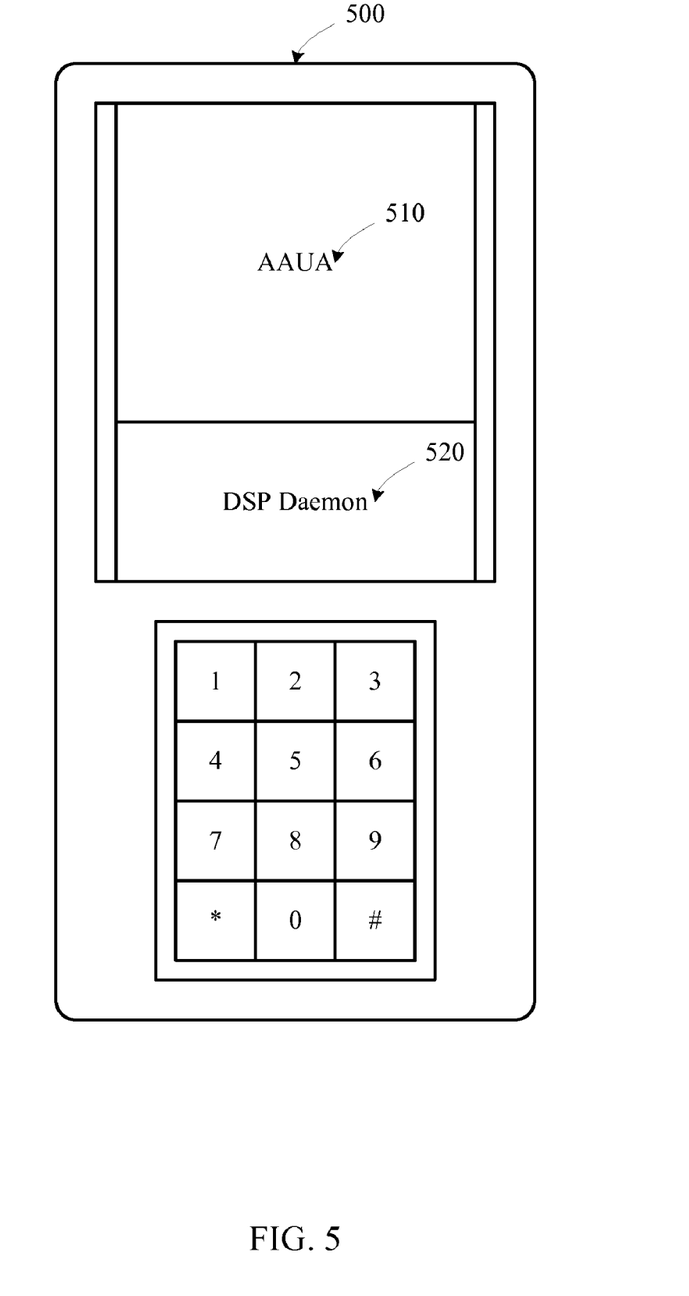
FIG. 5 illustrates a mobile telephone with a security software product installed thereon.

On the mobile telephone side, the decoding of the audio product update data may be handled by the Audio Active Update Agent (AAUA), which, in the particular embodiment shown in FIG. 1, is a software component that is a part of the security software product installed on the mobile telephone. FIG. 5 illustrates a mobile telephone with a security software product installed thereon. The security software product, also referred to as cell-phone security product (CSP), may consist of the Audio Active Update Agent 510 and the CSP daemon 520. The Audio Active Update Agent 510 decodes the received audio product update data back into binary format and updates the security software product using the binary product update data, while the CSP daemon 520, which is the main component of the security software product, may be responsible for protecting the mobile telephone from malware intrusions and attacks.

Figure 6:
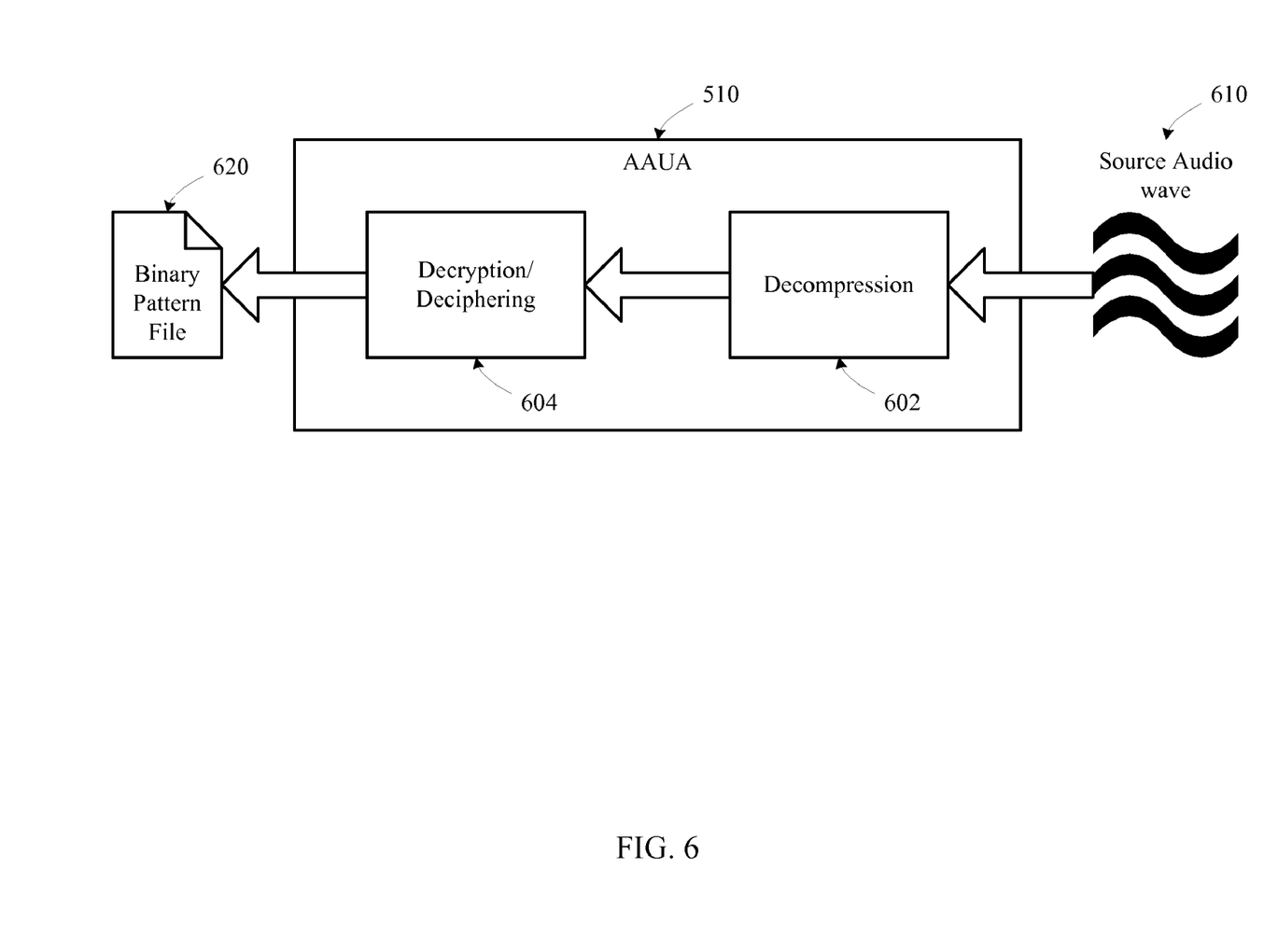
FIG. 6 illustrates a decoding process on a mobile telephone.

FIG. 6 illustrates a decoding process by the Audio Active Update Agent on a mobile telephone. Essentially, the Audio Active Update Agent 510 takes the product update data in audio format 610 as input and outputs the product update data in binary format 620.

When the mobile telephone receives the product update data in audio format 610, it may record the audio data until the transmission is completed. The complete audio data 610 may then be sent to the Audio Active Update Agent 510 for decoding. The Audio Active Update Agent 510 decompresses 602 the audio data based on a decompression algorithm corresponding to the compression algorithm used by the server and deciphers or decrypts 604 the audio data back into binary format based on a decryption protocol or algorithm corresponding to the encryption protocol or algorithm used by the server. Again, the decompression 602 and the decryption 604 of the audio update data 410 may be done in two separate steps as shown in FIG. 6 or combined in a single step. And if they are done in two separate steps, the order may vary, i.e., depending on the actual implementation, either decompression 602 or decryption 604 may be done first, followed by the other. The decrypted and decompressed data is outputted in binary format 620.

FIGS. 4 and 6 show one specific implementation of the product update data encoding and decoding processes. Encryption module 402, Compression module 404, Decompression module 602, and Deciphering module 604 may be software modules written in C, C++, Java™, etc. Alternative design and implementation for the encoding and decoding processes are also possible.

Figure 7:
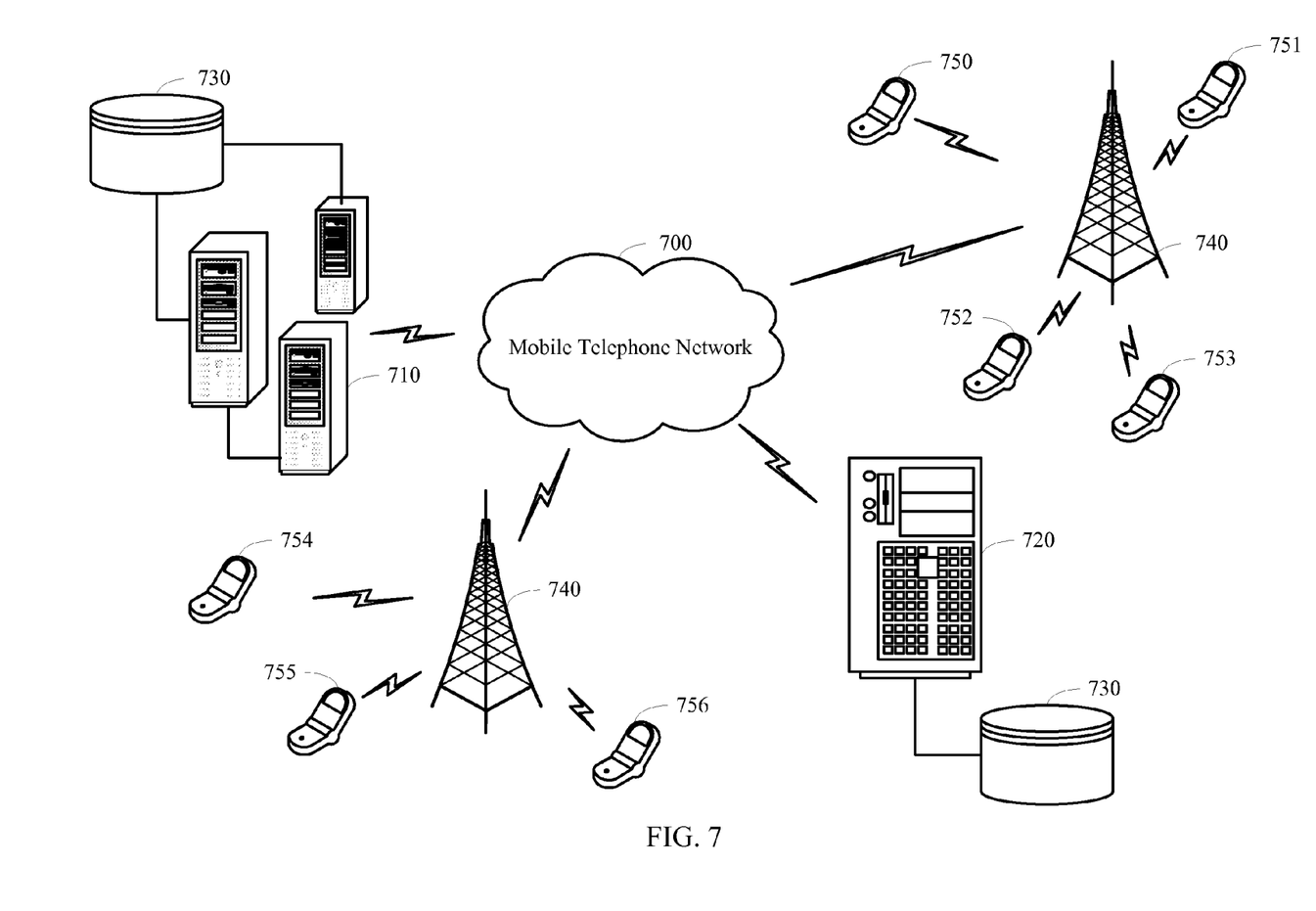
FIG. 7 is a simplified diagram of a mobile network environment in which specific embodiments of the present invention may be implemented.

FIG. 7 is a simplified diagram of a mobile network environment in which specific embodiments of the present invention may be implemented. The various aspects of the invention may be practiced in a wide variety of mobile telephone network environments (represented by network 700) connecting one or more servers 710, 720 with one or more mobile telephones 750, 751, 752, 753, 754, 755, 756. The servers 710, 720 and the mobile telephones 750, 751, 752, 753, 754, 755, 756 communicate with each other via voice connections and the audio data are transmitted using radio waves. One or more telephone towers 740 may help relay the audio signals to the mobile telephones 750, 751, 752, 753, 754, 755, 756.

In addition, the computer program instructions with which embodiments of the invention are implemented may be stored in any type of computer-readable media, and may be executed according to a variety of computing models including, for example, on a stand-alone computing device, or according to a distributed computing model in which various of the functionalities described herein may be effected or employed at different locations. A portion of the software program implementing various embodiments may be executed on the servers 720, while another portion of the software program may be executed on each of the mobile telephones 750, 751, 752, 753, 754, 755, 756.

The servers 710, 720 may be communicatively connected to one or more databases 730. Product update data as well as information about the security software product for the mobile telephones and customer information may be stored in these databases 730. The servers 710, 720 may access these types for such information as needed.

Although the systems and methods for updating software products installed on mobile telephones are described above in connection with anti-malware or security software, the same concept applies to updating all types of software products for mobile telephones. As long as the product update data may be encoded in audio format, they may be transmitted to the mobile telephones via standard voice or audio connections. Upon receiving the product updates, the mobile telephones may then decode them back into binary format for use in product updating.

While this invention has been described in terms of several preferred embodiments, there are alterations, permutations, and various substitute equivalents, which fall within the scope of this invention. It should also be noted that there are many alternative ways of implementing the methods and apparatuses of the present invention. For example, despite the references to the Internet and virtual communities above, embodiments are contemplated in which most or even all of the functionalities described herein for generating a profile are performed on a single, stand-alone computing device. It is therefore intended that the following appended claims be interpreted as including all such alterations, permutations, and various substitute equivalents as fall within the true spirit and scope of the present invention.

What is claimed is:

1. In a distributed mobile telephone network having at least one server and at least one mobile telephone, a method of transmitting security software product updates to a mobile telephone, comprising:
    encoding the security software product updates into audio format at said server, wherein encoding the security software product updates into audio format includes encoding binary product update data into hexadecimal format, with each possible hexadecimal digit represented by a unique audio tone for use to transmit the encoded security software product updates in audio format;
    establishing an audio connection between the at least one server and the mobile telephone; and
    transmitting the encoded security software product updates in audio format via the audio connection to the mobile telephone from said server.

2. The method, as recited in claim 1, further comprising:
    compressing the encoded security software product updates.

3. The method, as recited in claim 1, further comprising:
    verifying whether the security software product updates are appropriate for the mobile telephone at said server; and
    transmitting the encoded security software product updates to the mobile telephone only if the security software product updates are appropriate for the mobile telephone.

4. The method, as recited in claim 1, wherein the audio format for encoding the security software product updates complies with standard mobile telephone protocols.

5. The method of claim 1, further comprising disabling ringing of the mobile telephone while the transmitting is occurring.

6. The method of claim 1, further comprising encrypting the security software product updates during the encoding.

7. In a distributed mobile telephone network having at least one server and at least one mobile telephone, a method of updating a security software product on a mobile telephone, comprising:
    establishing an audio connection with a server;
    receiving security software product updates in audio format via the audio connection from the server;
    decoding the security software product updates from audio format into binary format, wherein decoding the security software product updates into binary format includes decoding encoded binary product update data that is encoded in hexadecimal format, with each possible hexadecimal digit represented by a unique audio tone for use to transmit the binary product update data in audio format; and
    updating the security software product using the decoded security software product updates in binary format.

8. The method, as recited in claim 7, further comprising:
    decompressing the security software product updates.

9. The method, as recited in claim 7, further comprising:
    recording the security software product updates in audio format.

10. The method of claim 7, further comprising disabling ringing of the mobile telephone while the receiving is occurring.

11. In a distributed mobile telephone network having at least one server and at least one mobile telephone, a method of transmitting security software product updates from a server to a mobile telephone, comprising:
    encoding the security software product updates into audio format on the server, wherein encoding the security software product updates into audio format includes encoding binary product update data into hexadecimal format, with each possible hexadecimal digit represented by a unique audio tone for use to transmit the binary product update data in audio format;
    establishing an audio connection between the server and the mobile telephone;
    transmitting the security software product updates in audio format via the audio connection from the server to the mobile telephone;
    recording the security software product updates in audio format on the mobile telephone;
    decoding the security software product updates into binary format on the mobile telephone; and
    updating a security software product installed on the mobile telephone using the security software product updates in binary format.

12. The method of claim 11, further comprising disabling ringing of the mobile telephone while the transmitting is occurring.

13. The method of claim 11, further comprising encrypting the security software product updates during the encoding.

14. In a distributed mobile telephone network having at least one server and at least one mobile telephone, a method of transmitting security software product updates to a mobile telephone, comprising:
- encoding the security software product updates into audio format at the server;
- establishing an audio connection between the at least one server and the mobile telephone, wherein said establishing includes
  - determining a telephone number associated with the mobile telephone,
  - transmitting a calling signal to the mobile telephone using the telephone number associated with the mobile telephone to initiate the audio connection, and
  - receiving a response from the mobile telephone, wherein if the response indicates that the mobile telephone is unavailable, reestablishing the audio connection after a predetermined time period, and if the response indicates that the mobile telephone is available, establishing the audio connection; and
- transmitting the encoded security software product updates in audio format via the audio connection to the mobile telephone.

15. In a distributed mobile telephone network having at least one server and at least one mobile telephone, a method of transmitting security software product updates to a mobile telephone, comprising:
- encoding the security software product updates into audio format at the server;
- establishing an audio connection with the mobile telephone;
- transmitting the encoded security software product updates in audio format via the audio connection to the mobile telephone;
- receiving an interruption signal from the mobile telephone during transmission of the encoded security software product updates via the audio connection;
- recording a current state of the transmission of the encoded security software product updates;
- stopping the transmission of the encoded security software product updates;
- reestablishing the audio connection with the mobile telephone after a predetermined time period; and
- resuming transmission of the encoded security software product updates based on the recorded current state of the transmission.

16. The method of claim 15, wherein the audio format includes an encoded version of the security software product updates using touch tones.

17. In a distributed mobile telephone network having at least one server and at least one mobile telephone, a method of updating a security software product on a mobile telephone, comprising:
- establishing an audio connection with a server, wherein establishing an audio connection with a server includes
  - receiving a calling signal, and
  - determining whether the calling signal is from the server, wherein if the calling signal is from the server, sending a response to the server indicating whether the mobile telephone is available and establishing the audio connection with the server if the mobile telephone is available;
- receiving security software product updates in audio format via the audio connection from the server;
- decoding the security software product updates into binary format; and
- updating the security software product using the decoded security software product updates in binary format.

18. The method, as recited in claim 17, wherein the calling signal from the server is identified by a unique indicator.

19. The method of claim 17, wherein the audio format includes an encoded version of the security software product updates using touch tones.

20. In a distributed mobile telephone network having at least one server and at least one mobile telephone, a method of updating a security software product on a mobile telephone, comprising:
- establishing an audio connection with a server;
- receiving security software product updates in audio format via the audio connection from the server;
- receiving a calling signal from a second telephone during reception of the security software product updates via the audio connection;
- sending an interruption signal to the server;
- stopping the reception of the security software product updates;
- disconnecting the audio connection with the server;
- notifying a user of the mobile telephone of a telephone call from the second telephone;
- reestablishing the audio connection with the server after the telephone call is completed;
- resuming reception of the security software product updates;
- decoding the security software product updates into binary format; and
- updating the security software product using the decoded security software product updates in binary format.

21. The method of claim 20, wherein the audio format includes an encoded version of the security software product updates using touch tones.

* * * * *